(12) United States Patent
Makiguchi et al.

(10) Patent No.: US 11,885,984 B2
(45) Date of Patent: Jan. 30, 2024

(54) AERIAL IMAGE DISPLAY DEVICE

(71) Applicant: Nippon Telegraph and Telephone Corporation, Tokyo (JP)

(72) Inventors: Motohiro Makiguchi, Tokyo (JP); Hideaki Takada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 708 days.

(21) Appl. No.: 16/982,659

(22) PCT Filed: Apr. 11, 2019

(86) PCT No.: PCT/JP2019/015734
§ 371 (c)(1),
(2) Date: Sep. 21, 2020

(87) PCT Pub. No.: WO2019/198780
PCT Pub. Date: Oct. 17, 2019

(65) Prior Publication Data
US 2021/0116718 A1    Apr. 22, 2021

(30) Foreign Application Priority Data

Apr. 12, 2018   (JP) ................. 2018-076627

(51) Int. Cl.
*G02B 30/56* (2020.01)
*G02B 27/28* (2006.01)

(52) U.S. Cl.
CPC .......... *G02B 30/56* (2020.01); *G02B 27/281* (2013.01)

(58) Field of Classification Search
CPC ....... G02B 27/01; G02B 27/10; G02B 27/14; G02B 27/0101; G02B 2027/0112; G02B 2027/0127; G02B 2027/0169; G02B 2027/0134; G02B 2027/0136; G02B 2027/0132; G02B 30/56; G02B 17/006; G02B 30/10
See application file for complete search history.

(56) References Cited

U.S. PATENT DOCUMENTS 5,074,645 A * 12/1991 Gold ..................... H04N 9/3105
359/638
5,583,695 A * 12/1996 Dobrusskin ............. H01J 29/89
359/633

(Continued)

FOREIGN PATENT DOCUMENTS

JP    2017049352 A  *  3/2017
JP    6232163         11/2017

*Primary Examiner* — Jade R Chwasz
(74) *Attorney, Agent, or Firm* — Fish & Richardson P.C.

(57) ABSTRACT

A housing including a first viewing direction and a second viewing direction opposite to the first viewing direction, a first display unit disposed to be spaced from a top surface on a side of one end of the housing at a first interval with a display surface facing the housing, a second display unit disposed on a side of the other end of the housing, a first optical element configured to transmit a portion of light emitted from the first display unit and reflect a portion of the light, a second optical element configured to transmit a portion of light emitted from the second display unit and reflect a portion of the light, and a third optical element configured to transmit a portion of the light emitted from the first display unit and the second display unit and reflect a portion of the light.

3 Claims, 7 Drawing Sheets

(56) References Cited

U.S. PATENT DOCUMENTS

2005/0156813 A1* 7/2005 Adachi ............... H04N 13/395
                                                          345/1.3
2018/0246337 A1* 8/2018 Makiguchi ............ G02B 5/12

* cited by examiner

AERIAL IMAGE DISPLAY DEVICE

CROSS-REFERENCE TO RELATED APPLICATIONS

This application is a National Stage application under 35 U.S.C. § 371 of International Application No. PCT/JP2019/015734, having an International Filing Date of Apr. 11, 2019, which claims priority to Japanese Application Serial No. 2018-076627, filed on Apr. 12, 2018. The disclosure of the prior application is considered part of the disclosure of this application, and is incorporated in its entirety into this application.

TECHNICAL FIELD

The present disclosure relates to an aerial image display device that displays an aerial image in each of two opposing directions.

BACKGROUND ART

As an aerial image display device for displaying an aerial image, for example, the one disclosed in Patent Literature 1 is known. The aerial image display device disclosed in Patent Literature 1 has two aerial images that are displayed with a depth in a front and rear direction when an observer located outside one end of a housing of the aerial image display device views a direction of the housing.

Additionally, by configuring the other side of the housing of the aerial image display device in the same manner as the one side, the two aerial images having a depth in a front and rear direction can also be displayed to the observer located outside the other end of the housing. A description written about a detailed configuration of the aerial image display device will be omitted.

CITATION LIST

Patent Literature

Patent Literature 1: JP 6232163 B

SUMMARY OF THE INVENTION

Technical Problem

However, the aerial image display device disclosed in Patent Literature 1 has a problem in that depth arrangement of images is reversed depending on a viewing direction. That is, when viewed from one end of the housing, it is assumed that, for example, an image α is seen on a front side and an image β is seen on a back side. Under the assumption, when viewed from an opposite direction of the housing, the image α is seen on the back side and the image β is seen on the front side. As described above, there is a problem in that a relationship of the front and the back in the depth arrangement is reversed depending on the viewing direction.

The present disclosure has been made in view of the problem. An object of the present disclosure is to provide the aerial image display device in which the depth arrangement of the images is not reversed depending on the viewing direction.

Means for Solving the Problem

An aerial image display device according to an aspect of the present embodiment includes a housing including a first viewing direction facing inward from an outside of one end and a second viewing direction facing inward from an outside of the other end, a first display unit disposed to be spaced from a top surface on a side of the one end of the housing at a first interval with a display surface facing the housing, a second display unit disposed to be spaced from a top surface on a side of the other end of the housing at a second interval with a display surface facing the housing, a first optical element having a plane, a size of which is larger than a size of the first display unit in plan view, disposed to be inclined toward the side of the one end, and configured to transmit a portion of light emitted from the first display unit and reflect a portion of the light, a second optical element having a plane, a size of which is larger than a size of the second display unit in plan view, disposed to be inclined toward the side of the other end, and configured to transmit a portion of light emitted from the second display unit and reflect a portion of the light, and a third optical element disposed outside a lower surface of the housing, and configured to transmit a portion of the light emitted from the first display unit and the second display unit and reflect a portion of the light, in which sizes of the first interval and the second interval are different.

Effects of the Invention

According to the present disclosure, it is possible to provide an aerial image display device in which a depth arrangement of images is not reversed depending on a viewing direction.

DESCRIPTION OF EMBODIMENTS

Embodiments of the present disclosure will be described below with reference to the drawings. The same component in a plurality of drawings has the same reference symbols designated, so its description is not repeated.

First Embodiment

Figure 1:
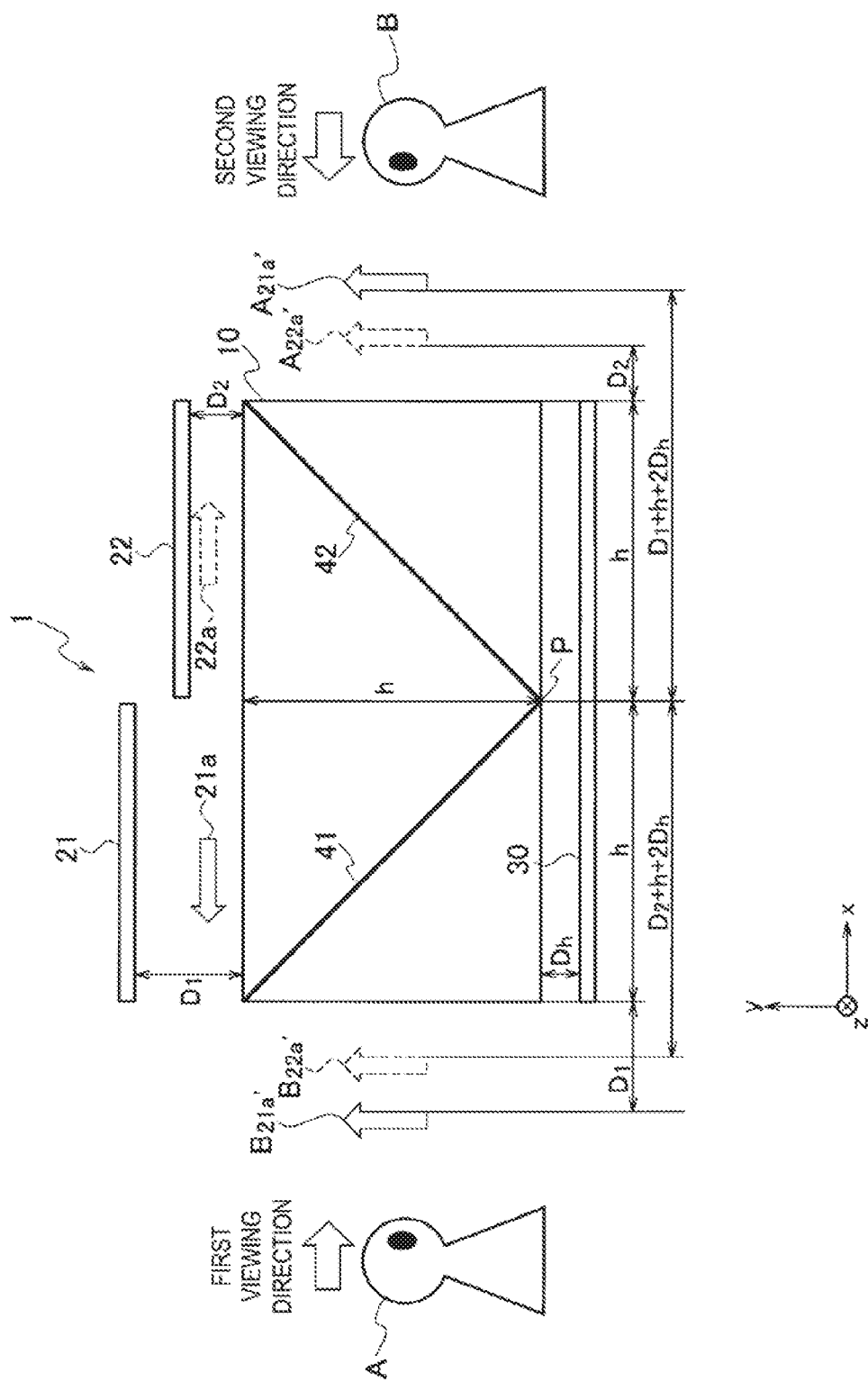
FIG. 1 is a side view schematically illustrating a schematic configuration example of an aerial image display device according to a first embodiment of the present disclosure.

FIG. 1 is a side view schematically illustrating a schematic configuration example of an aerial image display device according to a first embodiment of the present disclosure. The aerial image display device 1 illustrated in FIG. 1 includes a housing 10, a first display unit 21, a second display unit 22, a first optical element 41, a second optical element 42, and a third optical element 30.

Configuration

A three-dimensional shape of the housing 10 is, for example, a rectangular parallelepiped. A side surface shape of the housing 10 is a rectangle, and has a long side direction defined as an x direction and a height direction defined as a y direction. Then, a direction orthogonal to the x-y plane is defined as a z direction. FIG. 1 is a view in which a side surface of the housing 10 is viewed in the z direction.

A shape of one end of the housing 10 as viewed in the x direction is, for example, a square (not illustrated). The shape of the one end viewed in the x direction may be a rectangle. The housing 10 includes a first viewing direction from the outside of the one end facing the inside of the housing 10 (x direction) and a second viewing direction from the other end facing the inside of the housing 10 (−x direction).

The first display unit 21 is disposed to be spaced from an top surface of one end side of the housing 10 at a first interval $D_1$ with a display surface facing the housing 10. The first display unit 21 is constituted with, for example, any one of an organic EL panel, a liquid crystal panel with a backlight, and an LED panel, and displays an image on a display surface.

An arrow in the −x direction illustrated between the first display unit 21 and the housing 10 in FIG. 1 schematically illustrates an image 21a displayed on the display surface of the first display unit 21. The first display unit 21 may be constituted with, for example, a portable information device such as a smartphone and a tablet terminal. Additionally, it may be constituted with a display device having a display surface of a larger size.

Light emitted from the display surface of the first display unit 21 needs to be transmitted through the inside of the housing 10 in the −y direction. Accordingly, a top surface of the housing 10 is made of, for example, a transparent material such that the light emitted from the display surface enters the inside of the housing 10. Alternatively, an opening (not illustrated) through which the light enters is provided on the top surface of the housing 10.

The second display unit 22 is disposed to be spaced from atop surface of the side of the other end of the housing 10 at a second interval $D_2$ a display surface facing the housing 10. A dashed arrow in the x direction illustrated between the second display unit 22 and the housing 10 schematically illustrates an image 22a displayed on the display surface of the second display unit 22. The second display unit 22 is the same as the first display unit 21. Accordingly, further description is omitted.

The first optical element 41 has a plane, the size of which is larger than the size of the first display unit 21 in plan view, is disposed to be inclined toward one end side of the housing 10, and transmits a portion of the light emitted from the first display unit 21 and reflects a portion of the light. The first optical element 41 is constituted with, for example, a half mirror.

The first optical element 41 illustrated in FIG. 1 is disposed such that one end of the first optical element 41 is in contact with a center P of the long side of the lower surface of the housing 10 and the other end is in contact with a corner portion of the one end of the top surface of the housing 10. That is, the first optical element 41 is disposed to be inclined at an angle of 45 degrees in the −x direction with respect to a perpendicular from the center P.

The length of the first optical element 41 illustrated in FIG. 1 in the x direction is substantially equal to a height h of the housing 10. Additionally, a length of the first optical element 41 in the x direction is substantially equal to a length from one end of the long side of the lower surface of the housing 10 to the center P. Accordingly, the first optical element 41 forms an isosceles triangle having the first optical element 41 as an inclined surface, and a half of the lower surface of the housing 10 and the one end of the housing 10 as two sides. That is, a side surface shape of the housing 10 in the example is a shape where, when the height h in the y direction is equal to 1, the length in the x direction is 2 (2 h).

Accordingly, assuming that the first display unit 21 and the first optical element 41 have the same length in the z direction, the size of the plane of the first optical element 41 is larger than the size of the plane of the first display unit 21. Note that an inclination of the first optical element 41 in the −x direction need not be 45 degrees. For example, the angle may be from 30 to 60 degrees. Note that when the angle of the first optical element 41 decreases, the length of the first display unit 21 in the x direction needs to be increased. Additionally, when the angle of the first optical element 41 increases, the length of the first display unit 21 in the x direction needs to be reduced.

The second optical element 42 has a plane, the size of which is larger than the size of the first display unit 22 in plan view, is disposed to be inclined toward one end side of the housing 10, and transmits a portion of the light emitted from the first display unit 21 and reflects a portion of the light. The second optical element 42 differs from the first optical element 41 only in that the second optical element 42 is disposed to be inclined in the x direction.

The first optical element 42 illustrated in FIG. 1 is disposed such that one end of the first optical element 42 is in contact with the center P of the long side of the lower surface of the housing 10 and the other end is in contact with a corner portion of the other end of the top surface of the housing 10. Other parts are the same as the first optical element 41. FIG. 1 illustrates an example in which the one ends of the first optical element 41 and the second optical element 42 are in contact at the center P of the lower surface of the housing 10, but the present embodiment is not limited to the example. The one ends of the first optical element 41 and the second optical element 42 may be disposed to be separated. The example will be described later.

The third optical element 30 is disposed outside the lower surface of the housing 10 and transmits a portion of light emitted from the first display unit 21 and the second display unit 22 and reflects a portion of the light. The third optical element is constituted with, for example, a half mirror.

The third optical element 30 illustrated in FIG. 1 is disposed to be spaced from the lower surface of the housing 10 at an interval $D_h$, but may be disposed in close contact with the lower surface of the housing 10. That is, the interval $D_h$ may be zero.

Effects First, an aerial image that can be visually recognized by looking at the aerial image display device 1 from an observer A illustrated in FIG. 1 will be described. The observer A is located in the −x direction with respect to the housing 10.

To display the image 21a on the display surface of the first display unit 21, the light emitted from the first display unit 21 is transmitted through the first optical element 41 and enters the third optical element 30. In a case where the interval $D_h$ is equal to 0, it corresponds to a virtual image (not illustrated) of the image 21a being virtually formed at a position separated from the third optical element 30 by $D_1+h$ in the −y direction.

Here, in a case where the interval $D_h$ is not 0 ($D_h \neq 0$), it corresponds to a virtual image of the image 21a (not illustrated) being formed in a position separated from the third optical element 30 by $D_1+h+2D_h$ in the −y direction. The reason why the interval $D_h$ between the lower surface of the housing 10 and the third optical element 30 is doubled is because the light is reflected in the interval.

The third optical element 30 reflects a portion of the light transmitted through the first optical element 41. It corresponds to the light reflected from a virtual image (not illustrated) formed at a position separated from the third optical element 30 by $D_1+h+2D_h$ in the −y direction.

The light reflected from that virtual image (not illustrated) formed at the position separated by $D_1+h+2D_h$ in the −y direction is emitted toward the observer A by the first optical element 41, thus when the light is viewed from the observer A, the virtual image $A_{21a}'$ is visually recognized at a position separated from the one end (center P) of the first optical element 41 by $D_1+h+2D_h$ in the x direction. That is, the virtual image $A_{21a}'$, with reference to the first optical element 41, is formed at a position corresponding to the interval $D_1$ between the first display unit 21 and the housing 10 along the viewing direction of the observer A, the height h of the housing 10, and the interval $D_2$ between and the lower surface of the housing 10 and the third optical element 30. As described above, the light emitted from the first optical element 41 is reflected by the third optical element 30 and the first optical element 41 to form a virtual image $A_{21a}'$.

On the other hand, light emitted to display the image 22a from the second display unit 22 is reflected toward the observer A by the second optical element 42. The interval between the second display unit 22 and the top surface of the housing 10 is $D_2$, the interval between the second display unit 22 and the top surface of the housing 20 is equal to the interval between the second display unit 22 and the other end of the housing 10, and thus a virtual image $A_{22a}'$ of the image 22a is formed by being spaced from the other end of the housing 10 at the interval of $D_2$. In FIG. 1, the virtual image $A_{21a}'$ and the virtual image $A_{22a}'$ are indicated to have a thickness. However, this is for easy understanding, and the actual virtual image has no thickness.

By setting a relationship of the interval $D_1$ between the first display unit 21 and the housing 10 and the interval $D_2$ between the second display unit 22 and the housing 10 to, for example, $D_1>D_2$, the observer A can visually recognize an aerial image having a three-dimensional effect in which the virtual image $A_{22a}'$ is disposed on the front side and the virtual image $A_{21a}'$ is disposed on the back side. Note that it may be satisfied with $D_1<D_2$. In that case, the relationship of the front and the back of the virtual image is reversed. That is, the sizes of the interval $D_1$ between the first display unit 21 and the housing 10 and the interval $D_2$ between the second display unit 22 and the housing 10 may need only to be different.

Next, an aerial image that can be visually recognized by looking at the aerial image display device 1 from an observer B located in the x direction with respect to the housing 10 will be described. The effect of projecting the aerial image visually recognized by the observer B is the same as that of the aerial image visually recognized by the observer A. Accordingly, a brief description will be given.

To display the image 22a on the display surface of the second display unit 22, the light emitted from the second display unit 22 acts such that the light is reflected from a virtual image (not illustrated) formed at a position separated from the third optical element 30 by $D_2+h+2D_h$ in the −y direction and then again is emitted by the second optical element 42 toward the observer B. As a result, when viewed from the observer B, the virtual image $B_{22a}'$ is visually recognized at a position separated from the one end (center P) of the second optical element 42 by $D_2+h+2D_h$ in the −x direction.

Additionally, to display the image 21a on the display surface of the first display unit 21, the light emitted from the first display unit 21 is reflected by the first optical element 41 toward the observer B. As described above, by setting a relationship of the interval $D_1$ between the first display unit 21 and the housing 10 and the interval $D_2$ between the second display unit 22 and the housing 10 to, for example, $D_1>D_2$, the observer B can visually recognize an aerial image having a three-dimensional effect in which the virtual image $B_{22a}'$ is disposed on the front side and the virtual image $B_{21a}'$ is disposed on the back side. According to the aerial image display device 1 of the present embodiment as described above, it is possible to display an aerial image in which the depth arrangement of an image is not reversed depending on the viewing direction.

The aerial image display device 1 according to the present embodiment as described above, includes the housing 10, the first display unit 21, the second display unit 22, the first optical element 41, the second optical element 42, the third optical element 30, and the sizes of the first interval $D_1$ and the second interval $D_2$ are different. The housing 10 includes the first viewing direction that faces from the outside of the one end to the inside, and the second viewing direction that faces from the outside of the other end to the inside. The first display unit 21 is disposed to be spaced from the top surface of the side of the one end of the housing 10 at the first interval $D_1$ with the display surface facing the housing 10. The second display unit 22 is disposed to be spaced from the top surface of the side of the other end of the housing 10 at the second interval $D_2$ with the display surface facing the housing 10. The first optical element 41 has the plane, the size of which is larger than the sizes of the second display unit 22 and the first display unit 21 in plan view, is disposed to be inclined toward the side of the one end, and transmits a portion of the light emitted from the first display unit 21 and reflects a portion of the light. The second optical element 42 has the plane, the size of which is larger than the size of the second display unit 22 in plan view, is disposed to be inclined toward the side of the other end, and transmits a portion of the light emitted from the second display unit 22 and reflects a portion of the light. The third optical element 30 is disposed outside the lower surface of the housing 10 and transmits a portion of light emitted from the first display unit 21 and the second display unit 22 and reflects a portion of the light. The aerial image display device 1 can provide an aerial image display device in which the depth arrangement of an image is not reversed depending on a viewing direction.

Second Embodiment

Figure 2:
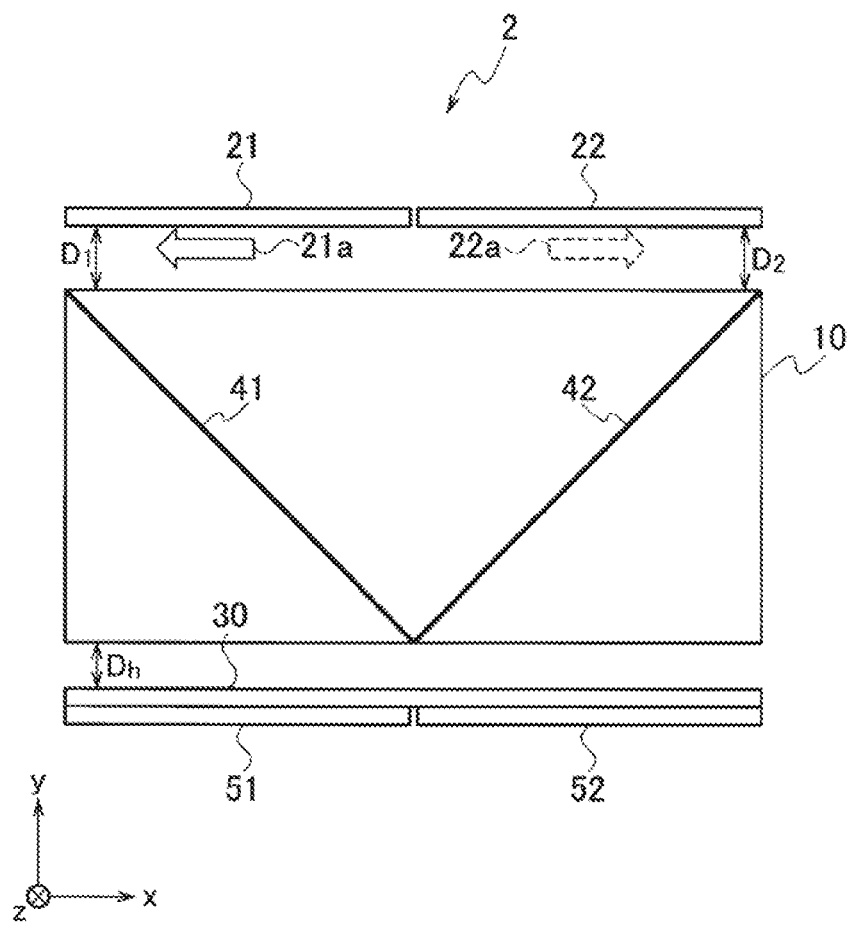
FIG. 2 is a side view schematically illustrating a schematic configuration example of an aerial image display device according to a second embodiment of the present disclosure.

FIG. 2 is a side view schematically illustrating a schematic configuration example of an aerial image display device according to a second embodiment of the present disclosure. The aerial image display device 2 illustrated in FIG. 2 is capable of displaying three (three layers) aerial images.

The aerial image display device 2 differs from the aerial image display device 1 (FIG. 1) in that a third display unit 51 and a fourth display unit 52 are provided. The third display unit 51 is disposed at a position facing the first display unit 21 on a side of the third optical element 30 opposite to the housing 10. The fourth display unit 52 is disposed at a position facing the second display unit 22 on the side of the third optical element 30 opposite to the housing 10. Accordingly, a third aerial image (virtual image) can be displayed in each of the first viewing direction and the second viewing direction.

Figure 3:
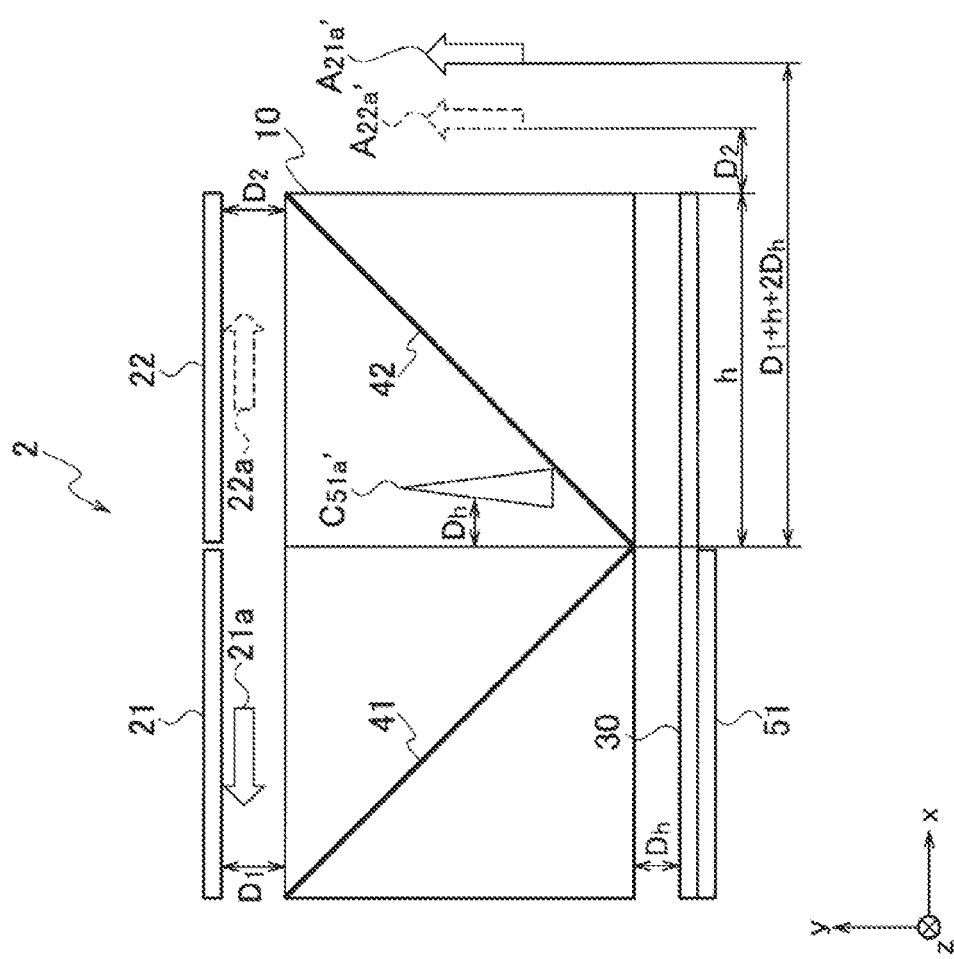
FIG. 3 is a view schematically illustrating an arrangement of an image (virtual image) of the aerial image display device illustrated in FIG. 2 as viewed from a first viewing direction.
Figure 3:
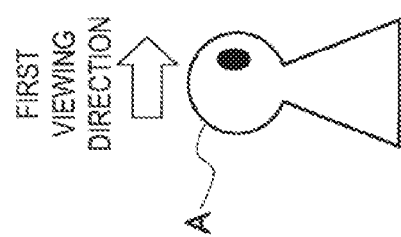

FIG. 3 is a view schematically illustrating a relationship of the front and the back (x direction) of an aerial image viewed by the observer A from the first viewing direction. In FIG. 3, the fourth display unit 52 is omitted.

An image $C_{51a}$ (not illustrated) is displayed on the display surface of the third display unit 51. To display the image $C_{51a}$ on the display surface of the third display unit 51, the light emitted from the third display unit 51 is transmitted through the third optical element 30 and is emitted toward the observer A by the first optical element 41.

Here, the interval $D_h$ between the lower surface of the housing 10 and the third optical element 30 is assumed that, for example, the interval $D_h$ is equal to 0. Additionally, it is assumed that the third optical element 30 is formed of, for example, a thin film vapor-deposited on the surface of the third display unit 51. That is, it is assumed that the display surface of the third optical element 30 is in close contact with the lower surface of the housing 10.

Assuming that, the observer A can visually recognize the virtual image $C_{51a}'$ of the image $C_{51a}$ as an aerial image having a three-dimensional effect on a perpendicular line from the center P with which the first optical element 41 and the lower surface of the housing 10 are in contact. If the interval $D_h$ between the lower surface of the housing 10 and the third optical element 30 is increased, the virtual image $C_{51a}'$ is moved from the center P to the x direction.

The virtual image $A_{21a}'$ of the image 21a displayed on the display surface of the first display unit 21 and the virtual image $A_{22a}'$ of the image 22a displayed on the display surface of the second display unit 22 are the same as the cases in the aerial image display device 1 (FIG. 1). Accordingly, according to the aerial image display device 2 of the present embodiment, the observer A can visually recognize an aerial image having a three-dimensional effect in the order of the virtual image $C_{51a}'$, the virtual image $A_{22a}'$, and the virtual image $A_{21a}'$, from the front side.

Figure 4:
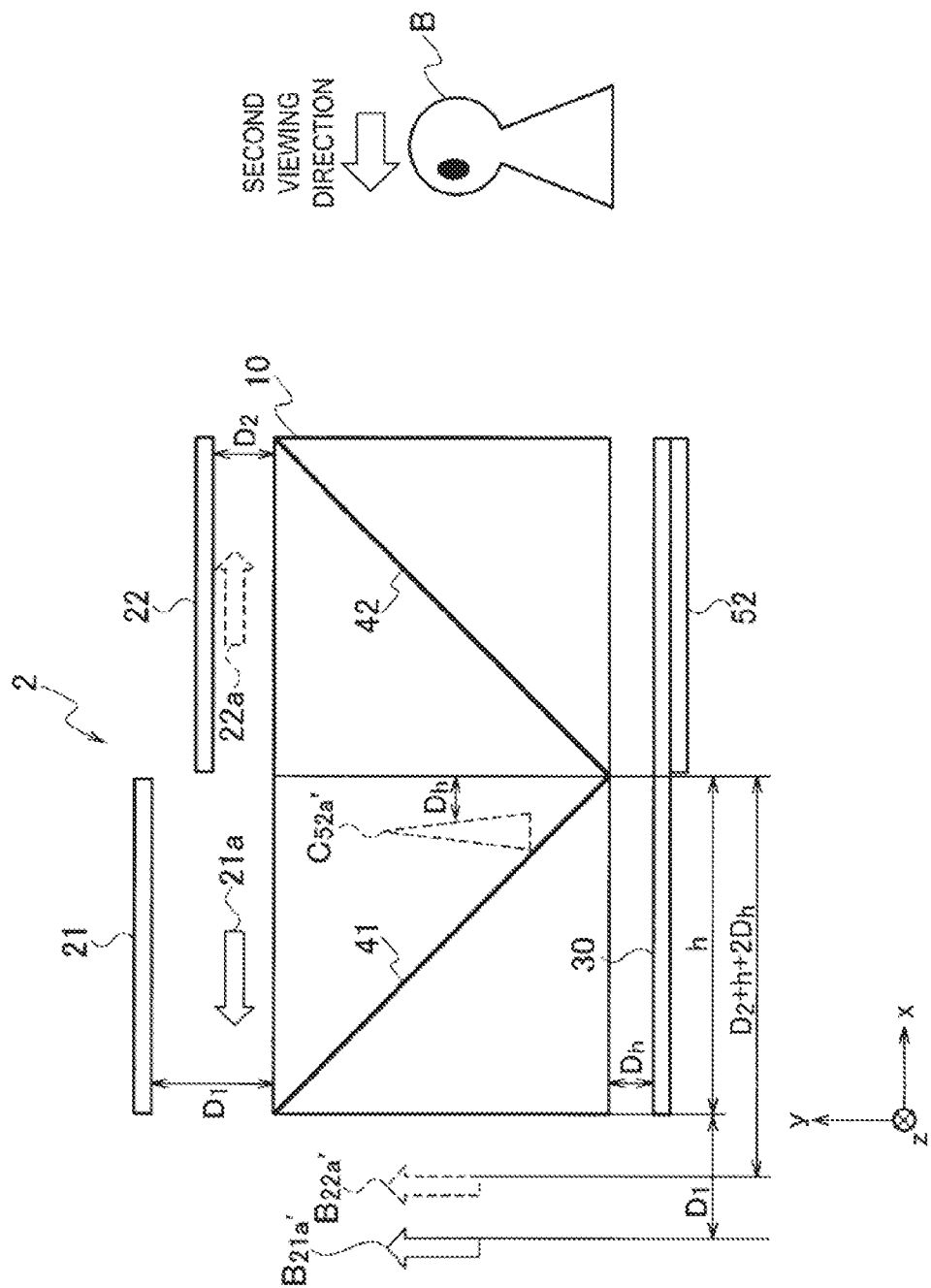
FIG. 4 is a view schematically illustrating an arrangement of an image (virtual image) of the aerial image display device illustrated in FIG. 2 as viewed from a second viewing direction.

FIG. 4 is a view schematically illustrating a relationship of the front and the back of an aerial image viewed by the observer B from the second viewing direction. In FIG. 4, the third display unit 51 is omitted.

In this case, the observer B can visually recognize the third virtual image $C_{52a}'$ as an aerial image having a three-dimensional effect on a perpendicular line of the center P with which the second optical element 41 and the lower surface of the housing 10 are in contact. If the interval $D_h$ between the lower surface of the housing 10 and the third optical element 30 is increased, the virtual image $C_{521}'$ is moved from the center P to the $-x$ direction. The action of visually recognizing the virtual image $C_{52a}'$ is the same as the example described with reference to FIG. 3. Accordingly, detailed description is omitted.

Although the example in which the surface of the third display unit 51 is in close contact with the lower surface of the housing 10 has been described, the interval $D_{2h}$ (not illustrated) between the surface of the third display unit 51 and the lower surface of the housing 10 may be separately set, and the interval $D_{2h}$ may be made variable. By changing the interval $D_{2h}$ between the surface of the third display unit 51 and the lower surface of the housing 10 separately from the interval $D_h$ between the third optical element 30 and the lower surface of the housing 10, the position of the virtual image $C_{51a}'$ corresponding to the display on the third display unit 51 can be independently controlled. Here, "independent" means that the position of the virtual image $C_{51a}'$ can be controlled independently of the virtual image $A_{21a}'$ corresponding to the display on the first display unit 21.

Third Embodiment

Figure 5:
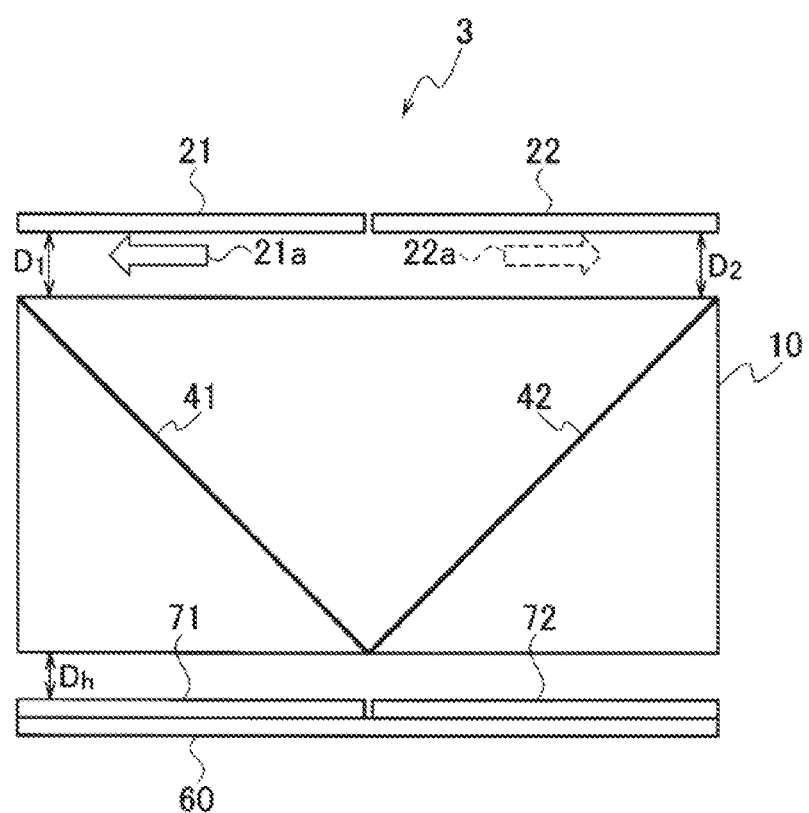
FIG. 5 is a side view schematically illustrating a schematic configuration example of an aerial image display device according to a third embodiment of the present disclosure.

FIG. 5 is a side view schematically illustrating a schematic configuration example of an aerial image display device according to a third embodiment of the present disclosure. An aerial image display device 3 illustrated in FIG. 5 can improve a brightness of each of the virtual image $A_{21a}'$ and the virtual image $B_{22a}'$.

The aerial image display device 3 includes a fourth optical element 60, and further includes a light transmission type fifth display unit 71 and a light transmission type sixth display unit 72. The fourth optical element 60 is disposed outside the lower surface of the housing 10 in place of the third optical element 30 and reflect the light emitted from the first display unit 21 and the second display unit 22. The fourth optical element 60 is constituted with, for example, a full mirror. The fifth display unit 71 is disposed between the fourth optical element 60 and the housing 10 and at a position facing the first display unit. The sixth display unit 72 is disposed between the fourth optical element 60 and the housing 10 and at a position facing the second display unit.

According to the aerial image display device 2 of the present embodiment, the light emitted to display the image 22a on the display surface of the second display unit 22 is transmitted through the first optical element 41, and is reflected by the fourth optical element 60 which is, for example, a full mirror. A brightness of the light reflected by the fourth optical element 60 is higher than a brightness of the light reflected by the third optical element 30 which is, for example, a half mirror. Then, the reflected light is emitted toward the observer A by the first optical element 41, so that the brightness of the aerial image of the virtual image $A_{21a}'$ can be improved. The same applies to the virtual image $B_{22a}'$ visually recognized by the observer B.

The brightness of each of the other aerial images such as the virtual image $A_{22a}'$, the virtual image $B_{21a}'$, the virtual image $C_{51a}'$, and the virtual image $C_{52a}'$ can be improved by increasing the brightness of the image displayed on the display surface of the corresponding display unit. That is, according to the aerial image display device 2 of the present embodiment, the brightness of the aerial image can be improved.

Fourth Embodiment

Figure 6:
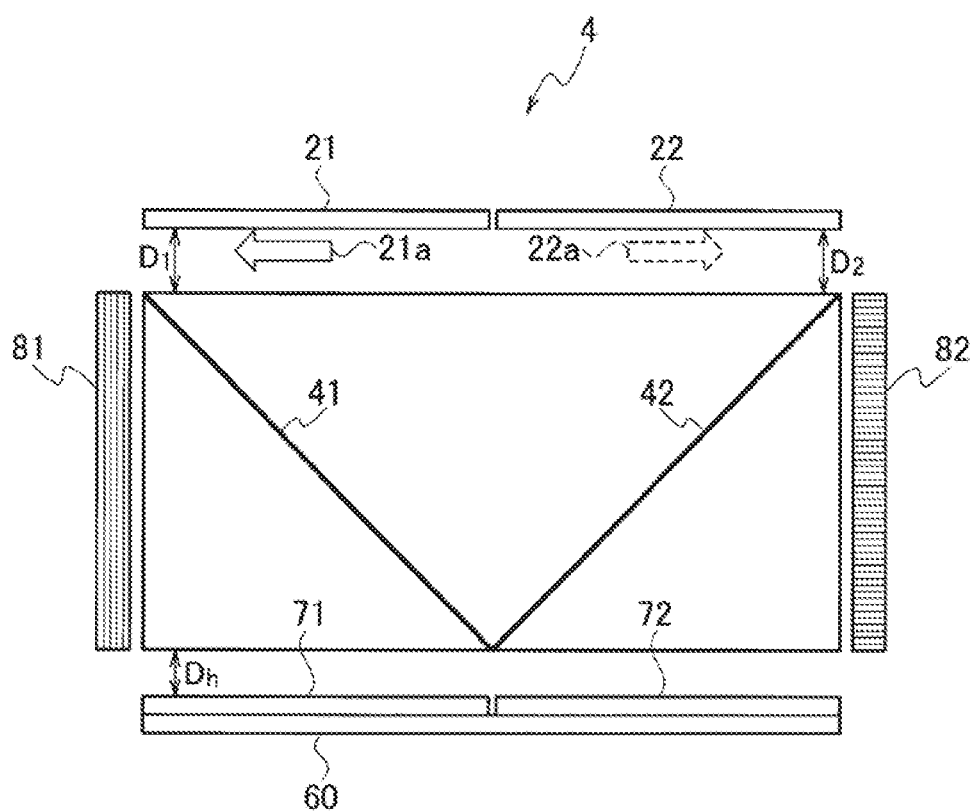
FIG. 6 is a side view schematically illustrating a schematic configuration example of an aerial image display device according to a fourth embodiment of the present disclosure.

FIG. 6 is a side view schematically illustrating a schematic configuration example of an aerial image display device according to a fourth embodiment of the present disclosure. The aerial image display device 4 illustrated in FIG. 6 is different from the aerial image display device 3 (FIG. 5) in that polarizing plates 81 and 82 are provided.

As is well known, a polarizing plate is a plate that transmits only light polarized in a specific direction. As illustrated in FIG. 6, for example, a first polarizing plate 81 for vertical linearly polarized light is disposed at one end of the housing 10, and a second polarizing plate 82 for horizontal linearly polarized light is disposed at the other end of the housing 10.

With such a configuration, a polarizing direction of the light in the x direction entering the inside of the housing 10 is limited to a vertical direction. Additionally, a polarizing direction of the light in the −x direction entering the inside of the housing 10 is limited to a horizontal direction. That is, the light in the background of the observer B (background light) can be shielded by the polarizing plate 81 from the observer A. Additionally, the light in the background of the observer A (background light) can be shielded by the polarizing plate 82 from the observer B.

As a result, the inside of the housing 10 can be made darker than the aerial image display devices 1 to 3 of the embodiments described above, and the visibility of the aerial image can be improved. The polarizing directions of the first polarizing plate 81 and the second polarizing plate 82 are not limited to linear polarization. A polarizing plate for a circular polarized light may also be used. In the case of the circular polarization, in a case where a polarizing direction of the first polarizing plate 81 is, for example, clockwise, a polarizing direction of the second polarizing plate 82 is counterclockwise. As described above, the polarizing directions of the first polarizing plate 81 and the second polarizing plate 82 include polarizing directions in pair.

The aerial image display device 4 of the present embodiment includes a first polarizing plate 81 disposed at the one end of the housing 10 to cover an area of light reflected by the first display unit 21 and a second polarizing plate 82 disposed at the other end of the housing 10 to cover an area of light reflected by the second display unit 22, and the polarizing directions of the first polarizing plate 81 and the second polarizing plate 82 are polarizing directions in pair. Accordingly, the visibility of the aerial image can be improved.

Modification Example

Figure 7:
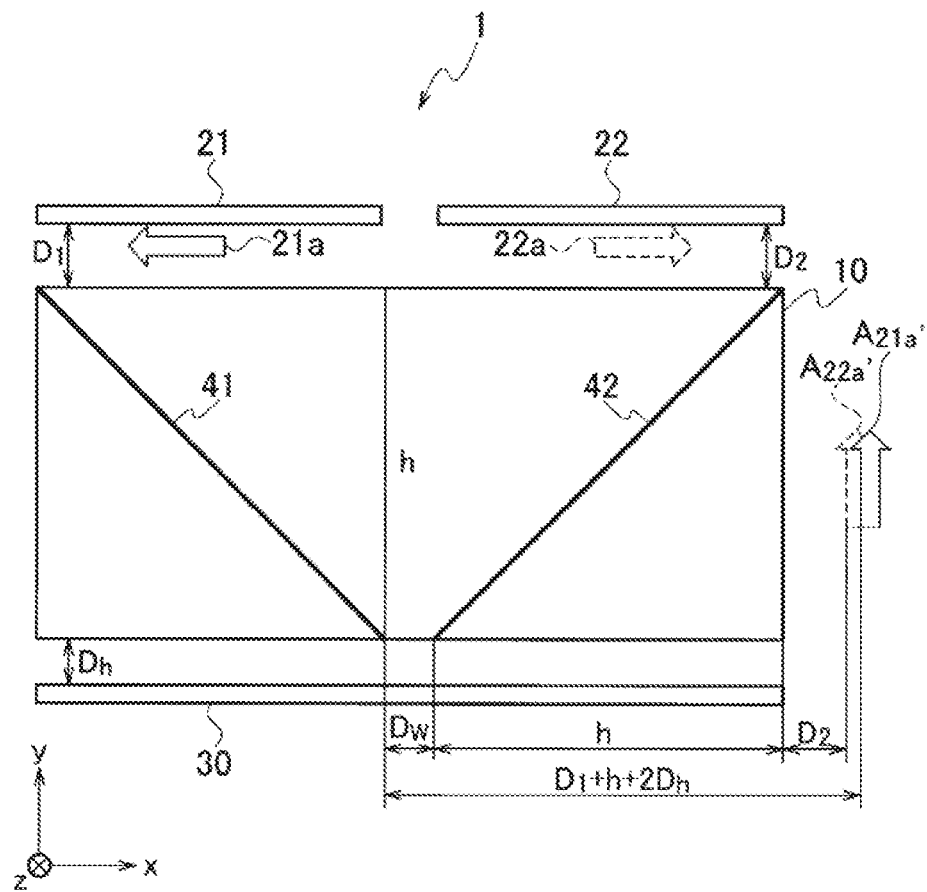
FIG. 7 is a side view schematically illustrating a schematic configuration example of a modification example of the aerial image display device illustrated in FIG. 1.

FIG. 7 is a side view schematically illustrating a schematic configuration example of a modification example of the aerial image display device 1 (FIG. 1). The aerial image display device 1 has been described with an example in which the one end of the first optical element 41 and the one end of the second optical element 42 coincide at the center P of the lower surface of the housing 10, but the present embodiment is not limited to the example.

As illustrated in FIG. 7, an interval (interval $D_W$) between the one end of the first optical element 41 and the one end of the second optical element 42 may be provided. By providing the interval $D_W$ between the one end of the first optical element 41 and the one end of the second optical element 42, the position of the virtual image $A_{21a}'$ moves by the length of the interval $D_W$ in the −x direction.

On the other hand, the position of the virtual image $A_{22a}'$ does not change, and thus the relationship of the front and the back in a depth direction (x direction) that the observer A visually recognizes may be reversed depending on a shifted amount of the virtual image $A_{21a}'$. To maintain the relationship of the virtual image $A_{22a}'$ on the front side and the virtual image $A_{21a}'$ on the back side, it is necessary that the length $D_1+h+2D_h$ from the one end of the first optical element 41 to the virtual image $A_{21a}'$ is longer than the length $D_W+h+D_2$ from the one end of the first optical element 41 to the virtual image $A_{22a}'$ (Formula 1).

[Formula 1]

$$D_w+h+D_2<D_1+h+2D_h \tag{1}$$

Rearranging Formula 1 for the interval $D_W$ gives the following formula.

[Formula 2]

$$D_w+h+D_2<D_1+h+2D_h \tag{2}$$

If the size of the interval $D_W$ satisfies Formula 2, the relationship of the front and the back in the depth direction (x direction) is not reversed. This is the same for the opposite −x direction. Additionally, the present disclosure can be applied to each of the aerial image display devices 1 to 4 of the first to fourth embodiments.

In such a manner, a shape of the housing 10 is not limited to the shape of the housing 10 described above. That is, the shape of the housing 10 is not limited to the height in the y direction h:the length in the x direction=1:2.

As described above, according to the aerial image display devices 1 to 4 of the present embodiments, it is possible to provide the aerial image display device in which the depth arrangement of the image is not reversed depending on the viewing direction. The embodiment described above has illustrated an example in which the first optical element 41, the second optical element 42, and the third optical element 30 are constituted with the half mirror. These optical elements are not limited to those that transmit 50% of light and reflect 50% of the light, which can be inferred from the wording of the half mirror. The transmittance and the reflectance may be in the range of, for example, 30 to 60%.

Additionally, the aerial image display device 4 of the fourth embodiment has been described with an example in which the aerial image display device 3 (FIG. 5) includes the polarizing plates 81 and 82, but the polarizing plates 81 and 82 may be included in the aerial image display devices 1 and 2. The aerial image display devices 1 and 2 including the polarizing plates 81 and 82 have the same action effect as the aerial image display device 4.

Additionally, the three-dimensional shape of the housing 10 has been described as an example of a rectangular parallelepiped having a square cross section in the z direction, but is not limited to the example. The cross section of the housing 10 in the z direction may have a shape such as a circle, an ellipse, and a polygon as long as the path of light emitted from the display unit is not affected.

In such a manner, the present disclosure is not limited to the embodiment described above, and can be modified within the scope of the gist.

REFERENCE SIGNS LIST 1, 2, 3, 4 Aerial image display device
10 Housing
21 First display unit
22 Second display unit
30 Third optical element
41 Second optical element
42 Third optical element
51 Third display unit
52 Fourth display unit
60 Fourth optical element
71 Fifth display unit (light transmission type)
72 Sixth display unit (light transmission type)

81 First polarizing plate
82 Second polarizing plate
D₁ First interval
D₂ Second interval
h Height of housing 10

The invention claimed is:

1. An aerial image display device comprising:
 a housing including a first viewing direction facing inward from an outside of one end and a second viewing direction facing inward from an outside of an other end;
 a first display unit disposed to be spaced from a top surface on a side of the one end of the housing at a first interval with a display surface facing the housing;
 a second display unit disposed to be spaced from a top surface on a side of the other end of the housing at a second interval with a display surface facing the housing;
 a first optical element having a plane, a size of which is larger than a size of the first display unit in plan view, disposed to be inclined toward the side of the one end, and configured to transmit a portion of light emitted from the first display unit and reflect a portion of the light;
 a second optical element having a plane, a size of which is larger than a size of the second display unit in plan view, disposed to be inclined toward the side of the other end, and configured to transmit a portion of light emitted from the second display unit and reflect a portion of the light; and
 a third optical element disposed outside a lower surface of the housing, and configured to transmit a portion of the light emitted from the first display unit and the second display unit and reflect a portion of the light;
 wherein sizes of the first interval and the second interval are different.

2. The aerial image display device according to claim 1, further comprising:
 a third display unit disposed at a position facing the first display unit on a side of the third optical element opposite to the housing; and
 a fourth display unit disposed at a position facing the second display unit on the side of the third optical element opposite to the housing.

3. The aerial image display device according to claim 1, further comprising:
 a first polarizing plate disposed at the one end of the housing to cover an area of light reflected by the first optical element; and
 a second polarizing plate disposed at the other end of the housing to cover an area of light reflected by the second optical element,
 wherein a first polarizing direction of the first polarizing plate is different from a second polarizing direction of the second polarizing plate.

\* \* \* \* \*